United States Patent
Zhou et al.

(10) Patent No.: US 10,074,012 B2
(45) Date of Patent: Sep. 11, 2018

(54) SOUND AND VIDEO OBJECT TRACKING

(71) Applicant: DOLBY LABORATORIES LICENSING CORPORATION, San Francisco, CA (US)

(72) Inventors: Cong Zhou, Fremont, CA (US); Timo Kunkel, Kensington, CA (US); Cristina Michel Vasco, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/624,475

(22) Filed: Jun. 15, 2017

(65) Prior Publication Data
US 2017/0364752 A1 Dec. 21, 2017

Related U.S. Application Data

(60) Provisional application No. 62/351,380, filed on Jun. 17, 2016.

(51) Int. Cl.
*H04N 5/93* (2006.01)
*G06K 9/00* (2006.01)
(Continued)

(52) U.S. Cl.
CPC ..... *G06K 9/00718* (2013.01); *G06K 9/00255* (2013.01); *G06K 9/00288* (2013.01);
(Continued)

(58) Field of Classification Search
CPC ........... G06K 9/00718; G06K 9/00255; G06K 9/4671; G06K 9/00288; H04R 1/326; H04N 13/0055; H04N 13/0048; H04N 5/9202; H04H 60/04; G11B 27/031; G10K 2200/10
(Continued)

(56) References Cited

U.S. PATENT DOCUMENTS

| 7,876,914 B2 | 1/2011 | Grosvenor |
| 8,233,642 B2 | 7/2012 | Mao |

(Continued)

FOREIGN PATENT DOCUMENTS

| WO | 2006/121896 | 11/2006 |
| WO | 2015/066062 | 5/2015 |
| WO | 2017/116952 | 7/2017 |

OTHER PUBLICATIONS

Vahedian A., "Identification of sound source in machine vision sequences using audio information", Video/Image Processing and Multimedia Communications, 2003, 4th EURASIP Conference focused on, vol. 2, pp. 601-606.

*Primary Examiner* — Robert Chevalier

(57) ABSTRACT

Image data relating to real-world objects or persons is collected from a scene while collecting audio data relating to the real-world objects or persons from the same scene. The audio data is used to derive sound objects corresponding to the real-world objects or persons. The image data is used to derive video objects corresponding to the real-world objects or persons. Based on the sound objects and the video objects, candidate salient objects are generated. A salient object is selected from among the candidate salient objects. Perceptual enhancement operations are performed on the selected salient object.

19 Claims, 11 Drawing Sheets

(51) Int. Cl.
  *H04R 1/32* (2006.01)
  *G11B 27/10* (2006.01)
  *G11B 27/031* (2006.01)
  *G10K 11/34* (2006.01)
  *H04N 13/00* (2018.01)
  *G06K 9/46* (2006.01)
  *H04H 60/04* (2008.01)
  *H04H 60/07* (2008.01)
  *H04H 60/48* (2008.01)
  *H04H 60/58* (2008.01)
  *H04H 60/59* (2008.01)
  *H04H 60/66* (2008.01)
  *H04N 9/802* (2006.01)
  *H04R 3/00* (2006.01)
  *H04S 7/00* (2006.01)

(52) U.S. Cl.
  CPC ............ *G06K 9/4671* (2013.01); *G10K 11/34* (2013.01); *G11B 27/031* (2013.01); *G11B 27/10* (2013.01); *H04H 60/04* (2013.01); *H04H 60/07* (2013.01); *H04H 60/48* (2013.01); *H04H 60/58* (2013.01); *H04H 60/59* (2013.01); *H04H 60/66* (2013.01); *H04N 9/802* (2013.01); *H04N 13/0048* (2013.01); *H04N 13/0055* (2013.01); *H04R 1/326* (2013.01); *H04R 3/005* (2013.01); *G10K 2200/10* (2013.01); *H04S 7/30* (2013.01); *H04S 2400/11* (2013.01)

(58) Field of Classification Search
  USPC ................ 386/285, 278, 280, 281, 241, 248
  See application file for complete search history.

(56) References Cited

U.S. PATENT DOCUMENTS

| | | |
|---|---|---|
| 8,761,412 B2 | 6/2014 | Hernandez-Abrego |
| 8,897,466 B2 * | 11/2014 | Ho .................... H04H 60/04 381/104 |
| 8,947,347 B2 | 2/2015 | Mao |
| 9,760,790 B2 * | 9/2017 | Novak ................. G06T 19/006 |
| 2005/0047647 A1 * | 3/2005 | Rutishauser ......... G06K 9/3233 382/159 |
| 2007/0223732 A1 | 9/2007 | Mao |
| 2013/0216070 A1 | 8/2013 | Kropp |
| 2013/0287225 A1 | 10/2013 | Niwa |
| 2014/0085538 A1 | 3/2014 | Kaine |
| 2014/0226823 A1 | 8/2014 | Sen |
| 2014/0233917 A1 | 8/2014 | Xiang |
| 2014/0278445 A1 | 9/2014 | Eddington, Jr. |
| 2014/0358557 A1 | 12/2014 | Sen |
| 2015/0016641 A1 | 1/2015 | Ugur |
| 2016/0005349 A1 | 1/2016 | Atkins |

* cited by examiner

SOUND AND VIDEO OBJECT TRACKING

CROSS-REFERENCE TO RELATED APPLICATION

The present invention claims priority to U.S. Priority Application No. 62/351,380 filed Jun. 17, 2016 which is hereby incorporated by reference in its entirety.

TECHNOLOGY

The present invention relates generally to media content, and in particular, to sound and video object tracking.

BACKGROUND

Media production tools typically require a large amount of manual input and intervention from mixing engineers and/or colorists. In order to create a complex audio soundscape and/or production-quality video images in a media content product, a mixing engineer and/or a colorist may painstakingly perform a large number of detailed manipulations, often through many iterations. However, it is difficult and time consuming to apply manual operations to scenes in which salient sounds and/or salient visual features may be dynamic in space time and may be intermingled with many other non-salient sounds and/o non-salient visual features such as background noises, ambient sounds, relatively unimportant visual details, etc.

As a result, a significant number of errors, inaccuracies, inconsistencies, etc., in sound or video timing, sound source positioning, sound effects, perceptual quality, etc., would be inevitably introduced.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
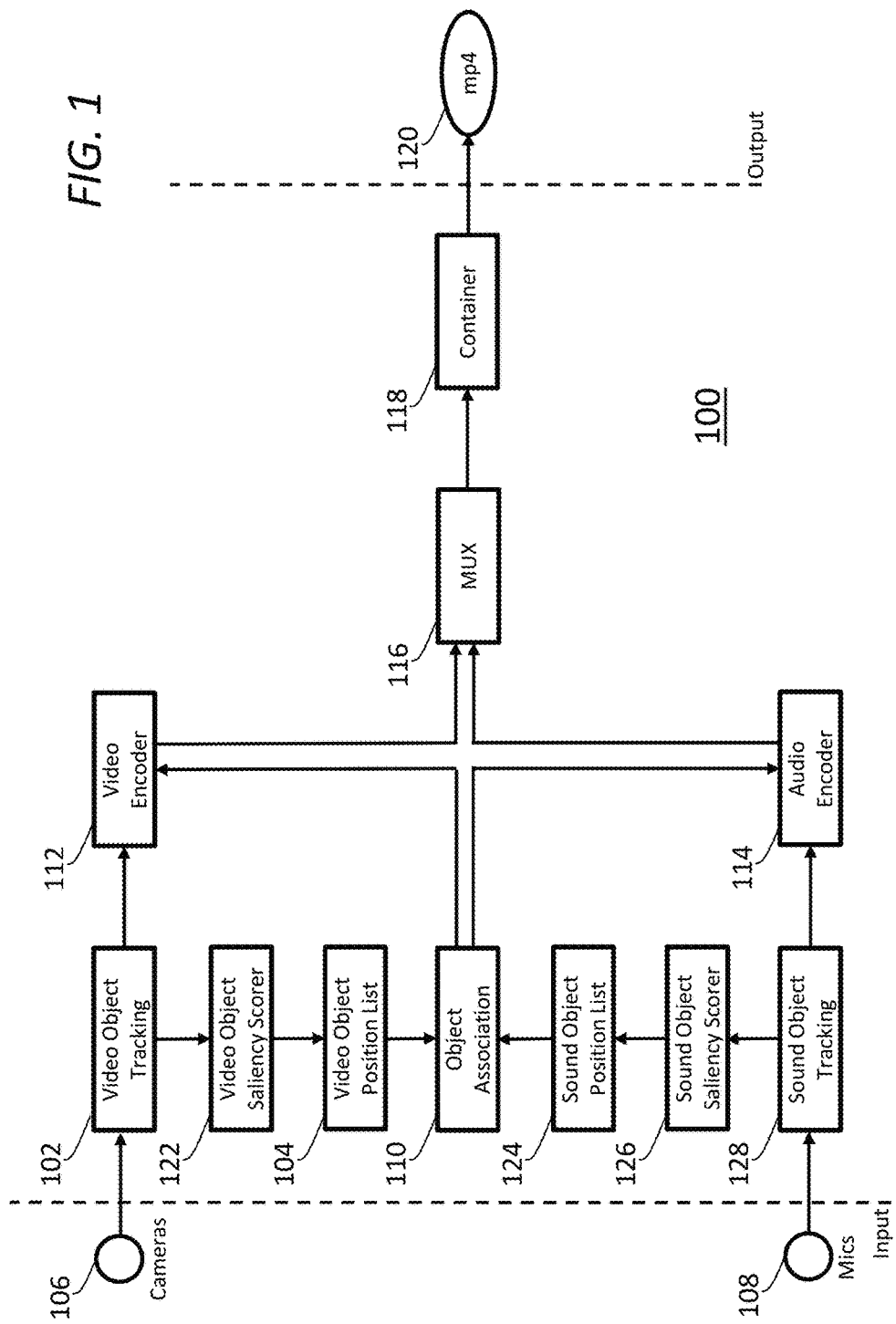
FIG. 1 depicts an example media system for sound and video object tracking.

Example embodiments, which relate to sound and video object tracking, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. GENERAL OVERVIEW
2. EXAMPLE MEDIA SYSTEM
3. VIDEO OBJECT TRACKING
4. SOUND OBJECT TRACKING
5. SOUND AND VIDEO OBJECT CORRELATION
6. SALIENT OBJECT GENERATION
7. TRACKING OBJECTS WITH TEMPORAL INTERRUPTION
8. EXAMPLE USAGE SCENARIOS
9. EXAMPLE PROCESS FLOWS
10. IMPLEMENTATION MECHANISMS—HARDWARE OVERVIEW
11. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to simplify and increase accuracy (e.g., timing accuracy, spatial positioning accuracy, etc.) in mapping sound elements and/or visual features in media content for professionals as well as end users. These techniques can be used to automatically assign sound objects representing the sound elements and/or video objects representing the visual features for rendering in a variety of different types of media content including but not limited to audio-only programs, audiovisual programs, movies, video programs, TV broadcasts, computer games, augmented reality (AR) content, virtual reality (VR) content, etc.

A media system that implements techniques as described herein may (e.g., automatically, programmatically, etc.) track positions and motions of media elements represented by sound objects and/or video objects in any type of coordinate system such as a spherical coordinate system (e.g., on a unit spherical surface, in a spherical volume, etc.), a Cartesian coordinate system, a projection-based coordinate system, an absolute coordinate system (e.g., the World coordinate), a relative coordinate system (e.g., stationary to a camera system, etc.), etc.

A spatial position/angle of an audio or video object at a given time may be specified based on a set of spatial coordinate values (e.g., pitch, roll, yaw, longitude, latitude, distance, displacements, x-y-z values, azimuthal values, elevation angle values, etc.).

An audio or video object can represent a stationary object or a dynamic object that traverses through a spatial trajectory comprising the spatial positions/angles of the object. Thus, the spatial position/angle of the audio or video object can be time constant or time varying.

In some embodiments, linear and/or angular velocities (e.g., rates of changes in the spatial positions/angles, etc.) of the audio or video object can also be tracked in a coordinate system which may, but is not necessarily limited to, be the same as the coordinate system in which the spatial positions/angles of the audio or video object are represented. Additionally, optionally, or alternatively, linear and/or angular accelerations (e.g., rates of changes in the linear and/or angular velocities, etc.) of the audio or video object can be further tracked in a coordinate system which may, but is not necessarily limited to, be the same as the coordinate system in which either the spatial positions/angles or the linear and/or angular velocities of the audio or video object are represented.

Media metadata may be (e.g., automatically, programmatically, in real time, in non-real-time, etc.) generated based on sound objects and/or video objects representing real-world people or objects. The media metadata may comprise audio metadata, image metadata, metadata related to both audio and video, etc., that includes positional and motion information related to the sound objects and/or video objects as extracted from source media content, extracted from raw media content, extracted from a video stream generated by a spherical camera, etc. The media metadata may be used by a media system for (e.g., automatically, programmatically, in real time, in non-real-time, etc.) tracking and assigning the sound objects and/or the video object to scenes represented in media content.

Under techniques as described herein, a media production workflow can be implemented based at least in part on automatic tracking and assigning objects and people to scenes to be depicted in media content. The workflow can be carried out with significantly less intensive labor and much reduced errors. As a result, media production cost and time can be significantly decreased while media production quality can be significantly raised, as compared with other approaches that do not adopt techniques as described herein.

Video objects can be identified and tracked in a video processing chain which incorporates computer vision technologies. The video objects can be merged with sound objects identified and tracked in a corresponding audio processing chain. Candidate salient objects can be created from the video objects and/or sound objects. Salient objects can be selected from the candidate salient objects. The salient objects may be applied with specific manipulations such as video object related manipulations, sound object related manipulations, etc., to enhance their saliency in media content relative to other (e.g., less salient, non-salient, etc.) objects.

Techniques as described herein can be implemented by any of a wide variety of media systems. In some embodiments, the techniques can be implemented by a studio-based object-based audio mixing tool, a studio-based object-based video production tool, etc., to extract and incorporate sound objects and video objects from input audio data and/or input video data for the purpose of media content generation or media content rendering. In some embodiments, the techniques can be implemented by an end-user audio mixing tool, an end-user video production tool, etc., to extract and incorporate sound objects and video objects from input audio data and/or input video data for the purpose of media content generation or media content rendering. As media content generated by end users are becoming more and more popular, end users and media content consumers, like their professional counterparts in professional studios, may make use of a simplified work flow under techniques as described herein to produce media content with high audio quality, high visual quality and low cost and complexity.

In some example embodiments, mechanisms as described herein form a part of a media processing system, including but not limited to any of: mobile device, VR system, AR system, head up display device, helmet mounted display device, CAVE-type system or wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, desktop computer, computer workstation, computer server, computer kiosk, or various other kinds of computing devices and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Example Media System

FIG. 1 depicts an example media system 100, which may be implemented with one or more computing devices. Examples of media systems may include, but are not necessarily limited to only, any of: a media production tool, an audio-only content production system, an audiovisual content production system, an audio mixing system, a color grading system, etc.

Audio data and image data processed by a media system (e.g., 100) as described herein may be received, obtained or captured using any suitable approaches. For example, the audio data may be received as an audio signal captured by one or more microphones mounted on a camera that is also acquiring the image data. One or both of the audio data and the image data may cover a relatively large spatial area, a relatively large spherical area (e.g., up to a full sphere, etc.), a relatively large spatial volume, etc.

In some embodiments, some or all of audio data portions processed by the media system (100) may or may not be incorporated into (output) media content generated by the media system (100). In some embodiments, some or all of audio data portions processed by the media system (100) may be enhanced before being incorporated into the output media content.

In some embodiments, audio data portions (e.g., desired artistic sound recordings, etc.) to be incorporated into the output media content can be captured (e.g. via boom microphone, via wireless shirt microphone, etc.) by one or more microphones collocated with or otherwise directed to one or more real-world persons or objects in a spatial environment in addition to other audio data captured by one or more microphones (e.g., mounted with a camera, etc.) collocated with one or more cameras that capture image data in the spatial environment. In a non-limiting example, the microphones collocated with or otherwise directed to the real-world persons or objects may, but are not necessarily limited to only, be relatively narrowly focused directional microphones. The microphones collocated with the cameras may, but are not necessarily limited to only, be spatial microphones (e.g., arranged in a spatial array or pattern, etc.) that cover a relatively large range of spatial directions in the spatial environment; these microphones may be referred to as spatial microphones.

In some embodiments, the media system (100) comprises a video object-tracking block 102, a video object saliency scorer block 122, a sound object-tracking block 128, a sound object saliency scorer block 126, an object association block 110, a video encoder 112, an audio encoder 114, a multiplexer 116, etc.

3. Video Object Tracking

In some embodiments, the video object-tracking block (102) is implemented with software, hardware, a combination of software and hardware, etc., to perform object extraction and tracking based at least in part on input image data captured with a camera system 106 deployed in a spatial environment. A spatial environment as described herein may be, without limitation, any of: physical spatial environment, simulated spatial environment, movie studios, outdoor scenes, indoor scenes, tunnels, streets, vehicles, ships, aircrafts, outer space, etc.

The camera system (106) comprises a set of one or more cameras such as a set of one or more directional cameras covering respective overlapping or non-overlapping solid angles from a reference position associated with the camera system (106). In some embodiments, the image data as captured by the camera system (106) comprises raw high dynamic range images, scene-referred images, etc. In some embodiments, the image data may be represented as, or converted into, spherical images. Examples of the camera system (106) may include, but are not limited to only, any of: light field cameras, multiple cameras with overlapping and/or non-overlapping fields of vision, digital cameras, non-digital cameras, analog cameras, cameras equipped with photosensitive chemicals, webcams, etc.

A spherical image as described herein may be recorded as pixel values on a 3D surface such as a sphere in the 3D space, and/or recorded as the pixel values projected to a projection in the 2D space. In some embodiments, the pixel values as projected on the projection represents an equirectangular image in the 2D space (e.g., a 2D Euclidian space as measured by angular degrees, etc.). The equator of the sphere may be mapped to the horizontal center line of the projection, whereas the poles in the sphere may be mapped (stretched substantially) to top and bottom lines of the projection.

It should be noted, however, that in various other embodiments, instead of being projected into a 2D plane, a spherical image as described herein can (additionally, optionally, or alternatively) be projected with different map projections, for example, into a cubic map (e.g., a surface in a 3D space), etc. Some examples of spherical images are described in U.S. Provisional Patent Application No. 62/272,284, "Viewport Independent Image Coding And Rendering," filed on 29 Dec. 2015, which is hereby incorporated by reference as if fully set forth herein.

In some embodiments, the video object tracking block (102) generates a plurality of video objects (e.g., object size information, object location information, object luminance information, object chroma information, etc.) for visual features tracked and extracted from the image data as captured by the camera system (106) and/or received from an image data source. The plurality of video objects may be used to generate a video object position list 104, which may be a list of positions per video object per spherical image (or per image frame) as functions of time. In some embodiments, the sound object tracking block (128) generates a plurality of sound objects (e.g., object size information, object location information, volume, pitch, timbre, etc.) for sounds tracked and extracted from the audio data as captured by the microphone system (108) and/or received from an audio data source. The plurality of audio objects may be used to generate a sound object position list 124, which may be a list of positions per sound object per unit time interval (e.g., per audio frame, per spherical image, etc.) as functions of time.

Figure 2A:
FIG. 2A through FIG. 2C illustrate example spherical images for visual feature tracking.
Figure 2B:
Figure 2C:
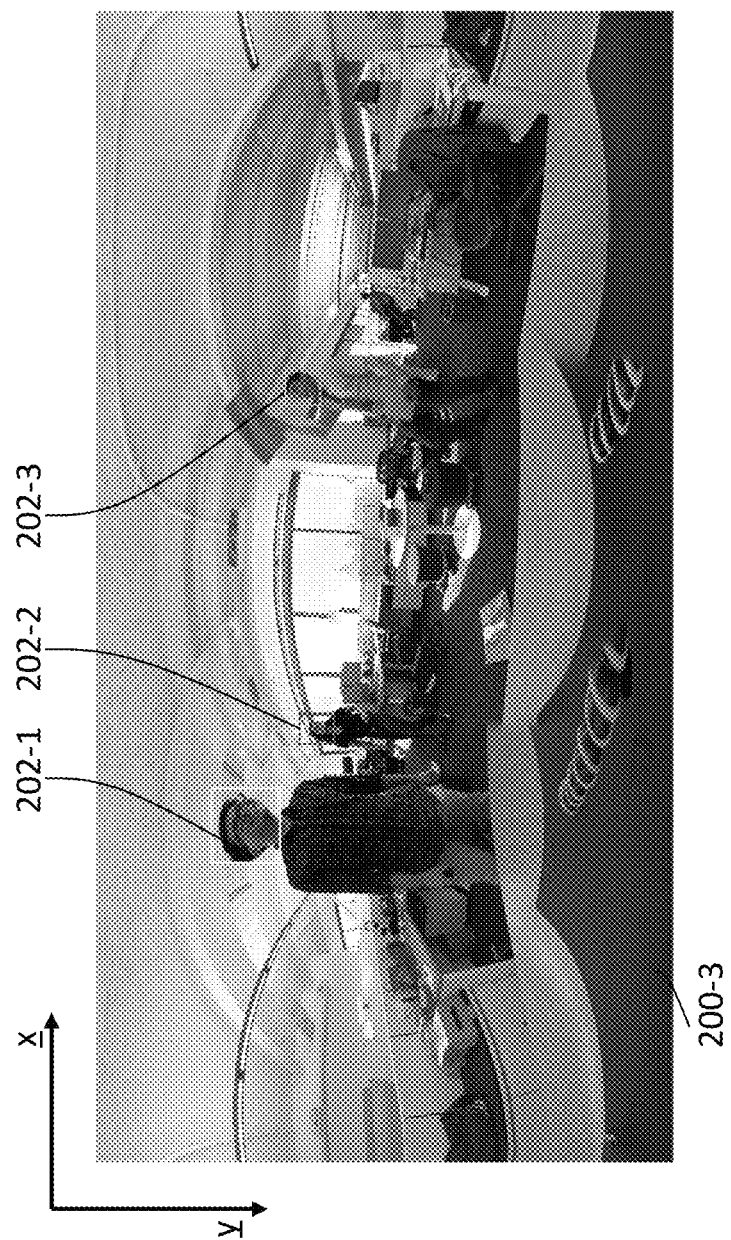

By way of example but not limitation, FIG. 2A through FIG. 2C illustrate example spherical images 200-1 through 200-3 in which a media system (e.g., 100, etc.) performs tracking (or facial tracking) and extracting video objects 202-1 through 202-3 such as human faces, etc.

The spherical images (200-1 through 200-3) may be captured by a spherical camera formed by the set of (e.g., three, four, five, six, etc.) directional cameras in the camera system (106). FIG. 2A depicts a first image frame 200-1 at time t. FIG. 2B depicts a second image frame 200-2 at time t+n. FIG. 2C depicts a third image frame 200-3 at time t+n+m.

The video object tracking block (102) may track and extract a video object (e.g., any of 202-1 through 202-3, etc.) such as a human face in one or more spherical images using any combination of one or more computer vision techniques such as Haar Filters, wavelet decomposition, Fourier space based spatial resolution tracking, etc.

Additionally, optionally, or alternatively, visual features represented by a video object as described herein can be found semantically based on other visual features present in the same image. For example, a person such as a driver can be found semantically after a car is discovered in the same image. Lips can be found semantically after a full human face is discovered in the same image.

Positional information of each video object (e.g., any of 202-1 through 202-3, etc.) tracked and extracted in each spherical image (e.g., any of 200-1 through 200-3, etc.) may be stored in a tangible storage medium.

The spherical images (200-1 through 200-3) or image frames of FIG. 2A through FIG. 2C are represented in a projection (e.g., an equirectangular space, etc.) in which a position is given in a set of (x, y) coordinate values. Such a position may be an absolute position (e.g., represented in the World coordinate, etc.) or a relative position (e.g., represented in a relative coordinate system stationary to the camera system (106), etc.). In some embodiments, a geometric transformation may be used to transform a set of (x, y) coordinate values of a position in the projection into a set of (pitch, roll, yaw) values in a (e.g., unit, etc.) sphere of 360 angular degree (e.g., 300 of FIG. 3A or FIG. 3B) times 180 angular degrees.

Additionally, optionally, or alternatively, a distance (e.g., a relative distance, an absolute distance, relative to the camera system (106), etc.) of a video object can be tracked by analyzing the video object's spatial scale or size (e.g., in degrees on the sphere, etc.). For example, if a visual feature representing a human face (e.g., corresponding to 202-3) becomes larger in an image as compared with the human face in a preceding image, the human face is coming closer to the camera system (106). Conversely, if a visual feature representing a human face (e.g., corresponding to 202-2) becomes smaller in an image as compared with the human face in a preceding image, the human face is moving away from the camera system (106).

4. Sound Object Tracking

In some embodiments, the sound object tracking block (128) is implemented with software, hardware, a combination of software and hardware, etc., to perform object extraction and tracking based at least in part on input audio data (e.g., input audio streams, input sound tracks, input microphone signals, etc.) captured with a microphone system 108 deployed in the spatial environment and/or received from an audio data source. The microphone system (108) may comprises a set of one or more microphones such as a set of one or more directional microphones, a set of one or more omnidirectional microphones, etc.

An omnidirectional microphone may capture sound from a sphere (or a relatively wide range of spatial angles) around the omnidirectional microphone, whereas a directional microphone may capture sound from a relatively small or defined range of spatial angles in relation to the directional microphone.

In some embodiments, the media system (100), or the sound object tracking block (128) therein, generates a plurality of sound objects (e.g., object size information, object location information, sound volume, audio sample data, etc.) from the audio data as captured by the microphone system (108).

A media system as described herein may operate with conjunction with one or more microphone systems (or microphone arrays) of different types, spatial configurations, response patterns, audio characteristics, etc.

In some operational scenarios, one or more (e.g., directional, etc.) microphones in the microphone system (108) may be attached to (e.g., worn by, co-moving with, collocated with, etc.) one or more real-world persons or objects. Each of the microphones may be assigned a pre-defined or pre-configured (e.g., unique) index value. Such an index value of a microphone may be given in system initialization time (e.g., when the microphone system (108) is initialized) before audio data portions from the microphone are acquired to be incorporated into scenes of a media program. The audio data portions from the microphone may be included in an audio stream (or a sound track) that is tagged with the index value assigned to the microphone.

For example, during a recording or live session, each microphone that is attached to a (e.g., tagged, etc.) real-world person, as respectively represented by 202-1 through 202-3 in FIG. 2A through FIG. 2C, may be logically assigned a (unique) index value. Audio data portions generated by each such microphone may be included in an indexed audio stream (or a sound track) with a respective index value. Indexed audio streams may be provided as at least a part of the input audio data to the media system (100) to generate sound objects based on the indexed audio streams.

Sound object position information (e.g., sound object position list (124), in the form of an indexed array, etc.) of sound objects representing the real-world persons or objects (202-1 through 202-3) may be determined by the sound object tracking block (128) based at least in part on tracking sounds in the input audio data. At the same time, video object position information (e.g., video object position list (104), in the form of an indexed array, etc.) of video objects representing the real-world persons or objects (202-1 through 202-3) may be concurrently, in parallel, etc., determined by the video object tracking block (102) based at least in part on tracking visual features in the input image data.

In some operational scenarios, microphones in the microphone system (108) may not be attached to real-world persons or objects. For example, an array or a spatial distribution of microphones may be deployed away from real world persons or objects, or otherwise unattached to at least some of the real world persons or objects in a spatial environment.

Figure 3A:
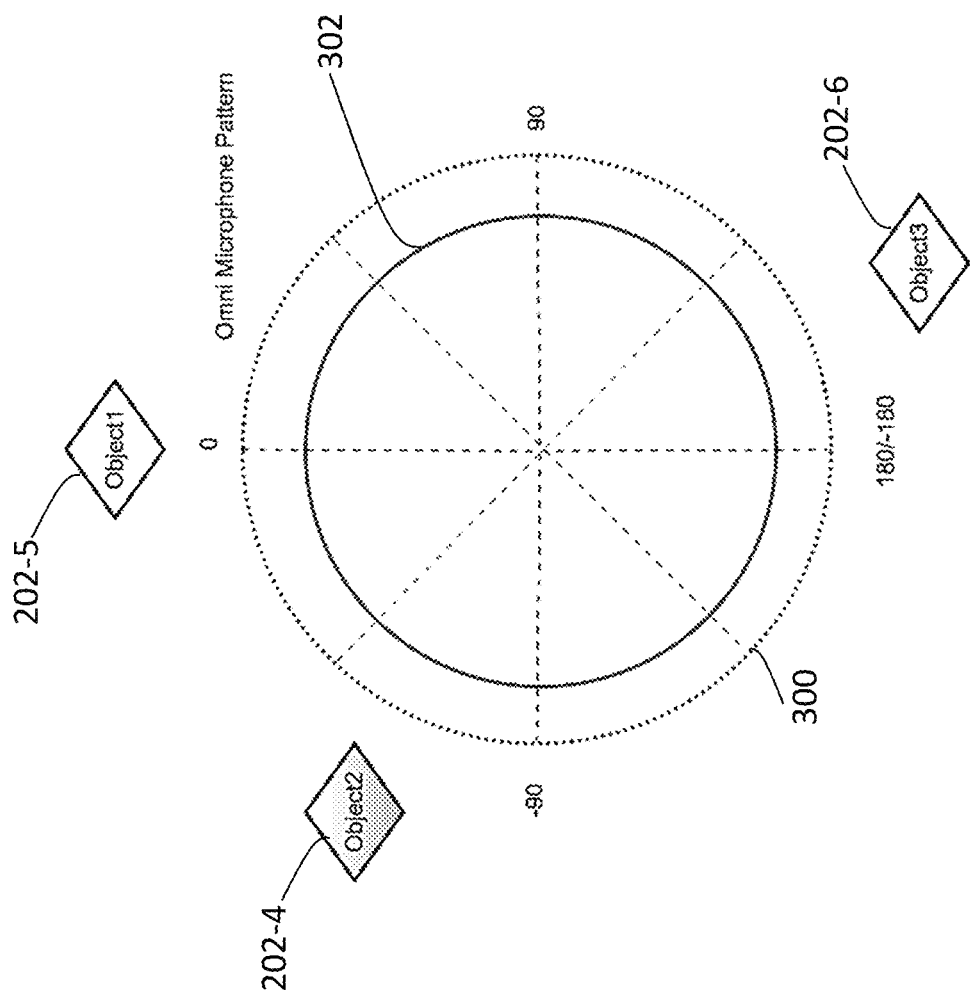
FIG. 3A and FIG. 3B illustrate example audio beam patterns for sound source tracking.

By way of example but not limitation, in the absence of applying audio beam forming, the array or spatial distribution of microphones may represent an omnidirectional microphone array that has an omnidirectional microphone pattern or audio beam pattern 302-1 as illustrated in FIG. 3A. As used herein, a microphone pattern or an audio beam pattern refers to a spatial distribution (or angular distribution) of microphone response sensitivity towards different spatial directions in a range (e.g., 300 of FIG. 3A or FIG. 3B, etc.) of spatial directions relative to a reference position (e.g., where the microphone system (108) is located, etc.).

Figure 3B:
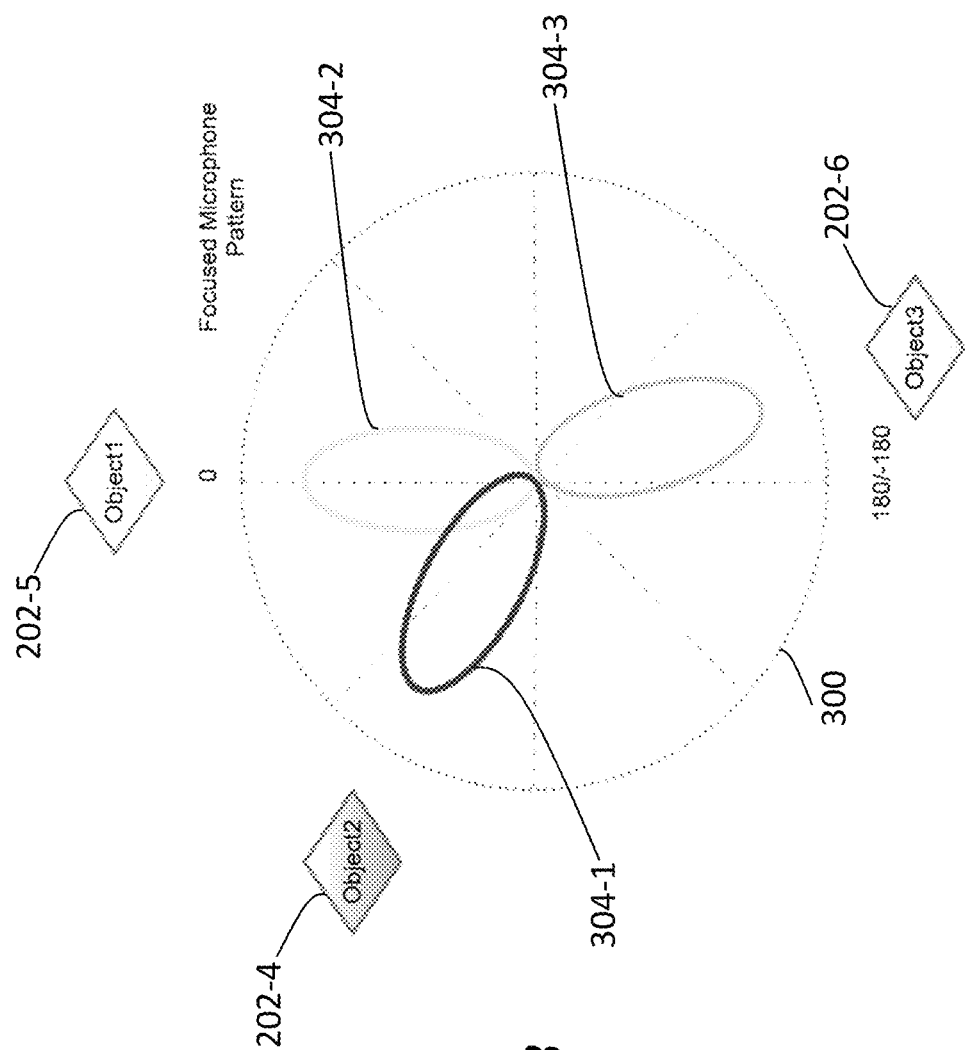

In some embodiments, microphone signals acquired by the microphone system (108) with the omnidirectional microphone pattern or audio beam pattern (302-1) of FIG. 3A can be spatially filtered (or applied with audio beam forming techniques) to generate a new audio beam pattern different from the initial audio beam pattern. The generated audio beam pattern may comprise different audio beams (e.g., 304-1 through 304-3, etc.) directed respectively to the different sound sources such as the real-world persons or objects (e.g., 202-4 through 202-6), etc. As illustrated in FIG. 3B, the different audio beams (304-1 through 304-3) correspond to different lobes of audio response sensitivity formed by spatially filtering the microphone signals, which, without such spatial filtering, may be omnidirectional as illustrated in FIG. 3A or may be directional but nevertheless do not comprise the different lobes directed respectively to the different sound sources.

A variety of audio beam forming techniques, audio beam steering techniques, audio focusing technologies, spatial filtering techniques, etc., may be used to create different audio beams directed respectively to different real-world persons or objects in a spatial environment as described herein. Some or all the different audio beams (e.g., 304-1 through 304-3, etc.) may be created by spatial filtering operations that are performed concurrently, serially, concurrently in part and serially in part, etc. In some embodiments, the object location information of the video objects derived from the input image data may be used for the purpose of creating, directing, or steering audio beams to the different real-world persons or objects in the spatial environment.

Each of the directional audio beams (e.g., 304-1 through 304-3, etc.) may be logically assigned a (e.g., unique) index value. Such an index value of an audio beam directed to a real-world person or object may be given at runtime or at a time when spatial filtering of microphone signals are performed. Audio data portions derived from the audio beam may be incorporated into scenes of a media program, for example, based on user input, based on artistic intent, based on a storyline, etc. The audio data portions from the audio beam may be encapsulated in an audio stream (or a sound track) that is tagged with the index value assigned to the audio beam.

Indexed audio streams and/or indexed video streams may be inputted into the media system (100), and may be processed by the video object tracking block (102), the video object saliency scorer block (122), the sound object tracking block (128), the sound object saliency scorer block (126), and/or the object association block (110) therein. Sound object position information (e.g., sound object position list (124), in the form of an indexed array, etc.) of the real-world persons or objects (202-1 through 202-3) from which the camera system (106) derives/captures video data and the microphone system (108) derives/captures audio data may be determined by the sound object tracking block (128). Sound objects identified in the sound object position information may be given sound saliency scores by the sound object saliency scorer block (126). The sound object position information and the sound saliency scores may be provided to the object association block (110). At the same time, video object position information (e.g., video object position list (104), in the form of an indexed array, etc.) of the same real-world persons or objects (202-1 through 202-3) may be determined by the video object tracking block (102). Video objects identified in the video object position information may be given video saliency scores by the video object saliency scorer block (122). The video object position information and the video saliency scores may be provided to the object association block (110). The object association block (110) can then correlate/match the sound objects that are derived from the input audio data with the video objects that are derived from the input video data, for example, at runtime, in real time, in non-real-time, in media production time, in media rendering time, etc., using the sound object position information, the sound object saliency scores, the video object position information, the video object saliency scores, etc.

5. Sound and Video Object Correlation

In some embodiments, the object association block (110) is implemented with software, hardware, a combination of software and hardware, etc., to associate/match image metadata comprising video objects (as generated by the video object tracking block (102)) with audio metadata comprising sound objects (as generated by the sound object tracking block (128)) derived from the input audio data. For example, the object association block (110) can associate/match object position information of the video objects to object position information of the sound objects.

As used herein, object position information may refer to linear positions, angular positions, linear velocities, angular velocities, linear accelerations, angular accelerations, etc., that is estimated or computed for a sound source (e.g., a real-world person or object, etc.) represented by a sound object or for a visual feature (e.g., a real-world person or object, etc.) represented by a video object. Object position information may include spatial dimensional information such as spatial coordinate values, etc., as well as time dimensional information (or time values) such as time points, time intervals or durations, etc. Some or all of an object's positions, velocities, accelerations, etc., may be represented as functions of time values along a common timing reference (or common timeline).

In some embodiments, the media system (100) is configured to use or establish a common timing reference in the process of correlating the sound objects and the video objects, and to resolve any timing variances between video frame rates (e.g., 120 frames per second, etc.) and audio sample rates (e.g., 1.53 millisecond, etc.) used by cameras, by microphones, by audio beams, etc. in capturing audio data and video data that are used to derive the sound objects and the video objects.

Under techniques as described herein, a sound object (e.g., corresponding to an audio stream, a sound track, represented by an audio object such as an ATMOS audio object, etc.) generated from audio data portions captured by a microphone collocated with (or otherwise directed to) a real-world person or object can gain or acquire (e.g., matched, associated, etc.) object position information related to the real-world person or object from a corresponding or linked video object representing the real-world person or object, and can further gain or acquire specific image data or visual features in a correlated video object. Conversely, a video object can also gain or acquire (e.g., matched, associated, etc.) object position information related to specific sound in a correlated sound object, and can further gain or acquire specific audio data or the specific sound in the correlated sound object.

In operational scenarios in which spatial microphones (e.g., mounted on different cameras, etc.) as described herein are distributed with finite non-zero spatial displacements/distances, the spatial microphones may capture correlated (e.g., in terms of amplitude, phase, or both) audio data portions generated based on sounds emitted by a sound source (e.g., a real-world person, a real-world object, etc.). The media system (100) can estimate or compute spatial (linear) distances from the spatial microphones and determine a (e.g., volumetric, etc.) position of the sound source by triangulating the spatial distances from respective (e.g., reference) positions at which the spatial microphones are located.

In an example implementation, a sound object (denoted as "atmosSoundObject") may comprise a set of data elements, functions, etc., representing captured audio data, object positional information, etc. The object positional information may include, but is not necessarily limited to only, any of: spatial dimensional values (e.g., x, y and/or z values in a Cartesian coordinate system, a radius value in a polar coordinate system, latitude, longitude, distance, etc.), time dimensional values such as one or more time durations (denoted as $t_s$) during which audible sounds are detected in the captured audio data. Additionally, optionally, or alternatively, the object positional information includes motion vectors (denoted as $v_s$) corresponding to one or more of displacements, velocities, accelerations, etc. In some embodiments, at least some of the data elements of the sound object can be derived from salient audio elements/characteristics such as pitch, frequency characteristics, etc. In some embodiments, at least some of the data elements of the sound object can be derived (e.g., through phase/amplitude correlation, spatial filtering, etc.) from spatial information captured in microphone signals (e.g., spherical sound recordings, sound recordings made with spatially distributed microphones, etc.). In some embodiments, at least some of the data elements of the sound object can be derived from speech recognition; for example, timbre, pitch, character can be used to classify and track different sound sources (or speakers) from among a plurality of sound sources in a spatial environment.

In an example implementation, a video object (denoted as "visualObject") may comprise a set of data elements, functions, etc., representing an extracted visual feature (e.g., representing a human face, etc.), object positional information, etc. The object positional information may include, but is not necessarily limited to only, any of: spatial dimensional values (e.g., x, y and/or z values in a Cartesian coordinate system, a radius value in a polar coordinate system, latitude, longitude, distance, a spatial area, a spatial volume, a spatial shape such as circle, rectangle, polygon, etc.), time dimensional values such as one or more time durations (denoted as $t_v$) during which the visual feature is detected in image data. Additionally, optionally, or alternatively, the object positional information includes motion vectors (denoted as $v_v$)

corresponding to one or more of displacements, velocities, accelerations, etc. In some embodiments, at least some of the data elements of the video object can be derived from salient visual elements/characteristics such as semantic information (e.g., human face, red car, sports car, etc.) or salient visual information (e.g., relatively high contrast as compared with other image details, relatively high spatial frequency as compared with background, etc.), etc. In some embodiments, at least some of the data elements of the sound object can be derived from facial recognition; for example, facial features can be used to classify and track different real-world persons from among a plurality of real-world persons in a spatial environment.

Video objects (e.g., locations, non-location attributes, etc.) identified/generated based on the image data generated by the cameras can be correlated/merged with sound objects identified/generated from the other audio data generated by the spatial microphones, for example, to create candidate salient objects that correlate the video objects with the sound objects. The audio data to be incorporated into the output media content, acquired by microphones not necessarily collocated with the cameras, may be linked/correlated (e.g., based on audio characteristics, etc.) to the candidate salient objects, the sound objects or the video objects.

In various embodiments, any combination of one or more object identification and correlation techniques may be used to identify and correlate/merge video objects and sound objects. For example, the media system (100) may implement a function (denoted as "identify_Linked_Sound_And_Vision_Object(currentFrame)") as shown in TABLE 1 to identify and correlate video objects with sound objects (which may be represented as an ATMOS audio object).

The media system (100) may determine whether a sound object with known object positional information corresponds to a video object with known object positional information based on object position information of both of the objects. The multimedia system (100) may establish a correspondence relationship between a sound object and a video object based on positional proximity at a given time value in the common timing reference, as determined based on the object positional information of both of the objects. Additionally, optionally, or alternatively, the multimedia system (100) may establish the correspondence relationship between the sound object and the video object based on motion similarity at a given time value in the common timing reference, as determined based on the object positional information of both of the objects. The motion similarity may be determined based on positional differences between time-wise adjacent image frames and/or volumetric positional differences between time-wise adjacent audio data portions.

In response to determining that a sound object with known object positional information does not correspond to any video object with known object positional information, the media system (100) may apply salient feature detection in image data. Known positional information of the sound object may be used to narrow the scope of search in image data and to help identifying/generating/enhancing a corresponding video object. Additionally, optionally, or alternatively, the known positional information of the sound object may be used to align or set coordinate values of the corresponding video object in relation to a common reference spatial position, a common reference angular position, etc.

Similarly, in response to determining that a video object with known object positional information does not correspond to any sound object with known object positional

TABLE 1 function identify_Linked_Sound_And_Vision_Object(currentFrame)

```
{
    if atmosSoundObject is known && visualObject is known
    {
        align/correlate positional information of atmosSoundObject and
            visualObject
    } elseif atmosSoundObject is known && visualObject is unknown
    {
        apply salient feature detection in image data
        positional information of atmosSoundObject can aid the identification /
            alignment of reference coordinates of visualObject
    } elseif atmosSoundObject is unknown && visualObject is known
    {
        apply salient feature detection in audio data
        visualObject can aid the identification / alignment of reference
            coordinates of atmosSoundObject
    } elseif neither atmosSoundObject nor visualObject is known
    {
        apply salient feature detection in both image data and audio data
        align salient elements
        (this may yield a better outcome as there is more data available for
            alignment (sound saliency and image saliency). E.g. match position of
            detected speech to position of detected lips/face.)
    } endif
    return SalientObject.area (single point to full sphere; or volume if 3D)
            SalientObject.position (e.g. centroid of area)
            SalientObject.motionVector (change of SalientObject.position per
                time ts or tv e.g. to prev. frame)
            SalientObject.ViewingAngle (if part of AS3D image/tapestry etc.)
            SalientObject.SaliencyScore (how salient is the object. Can be
                computed with tools such as face detection, Visual Difference
                Predictor - VDP, level of visibility, etc.)
}
``` information, the media system (100) may apply salient feature detection in audio data. Known positional information of the video object may be used to narrow the scope of search (e.g., via spatial filtering, etc.) in audio data and to help identifying/generating/enhancing a corresponding sound object. Additionally, optionally, or alternatively, the known positional information of the video object may be used to align or set coordinate values of the corresponding sound object in relation to a common reference spatial position, a common reference angular position, etc.

In response to determining that there is neither a sound object with known object positional information nor a video object with known object positional information, the media system (100) may apply salient feature detection in both image data and audio data. Positions, etc., of salient sound and visual elements detected in the image data and the audio data may be aligned. This may yield a better outcome than some other cases as relatively numerous salient elements can be detected and made available for object positional alignment. Relatively high spatial resolutions of salient visual and sound elements may be achieved. For example, a position of a detected salient sound element such as speech may be matched with a position of detected lips or a human face. Door opening sound or sound from behind a door may be matched with a position of the door. Detected and matched salient features/elements may be encapsulated or represented in enhanced or new video objects and/or enhanced or new sound objects.

6. Salient Object Generation

In some embodiments, candidate salient objects (denoted as "SalientObject" in TABLE 1) may be generated by the media system (100) to correlate between a set of video objects with a set of corresponding sound objects. For example, the function as shown in TABLE 1 may return one or more candidate salient objects. In some embodiments, a candidate salient object may comprise a set of data elements, functions, etc., including but not limited to any of: area (e.g., single point, full sphere, triangle, a round shape, a rectangle shape, a regular or irregular shape, etc.), volume (if three dimensional space is to be represented in the output media content), position (e.g., centroid of area, etc.), one or more motion vectors (e.g., change in position or velocity between successive image frames or between successive audio samples, etc.), a viewing angle, a saliency score, etc.

As used herein, the term "viewing angle" may refer to a viewer's viewing direction to a video object or a sound object in a 3D application. Different images may be displayed to different viewers depending on the viewers' viewing angles. For example, in autostereoscopic three-dimensional (AS3D) display application, a video object such as a car with an active light beam may look perceptually very different depending on a viewing angle of the car relative to a viewer of the 3D display application. If the active light beam is directed towards a first viewer (of a 3D viewing application) at a first viewing position, the first viewer may perceive blinding light. In contrast, if the active light beam is not directed towards a second viewer (of the same 3D viewing application) at a second viewing position, the second viewer may perceive a relatively dark image with little headlight. Similarly, an area (e.g., polygon) or volume may look differently (e.g., non-uniformly, etc.) to different viewers depending on the viewers' viewing angles.

In some embodiments, if a salient object is not visible in a viewing angle, a corresponding image corresponding to the viewing angle may be compressed more than a different image of a different viewing angle in which the salient object is visible.

In some embodiments, a sound object as described herein may be associated with auditory directionality (e.g., listening angle instead of viewing angle) similar to how a viewing angle may be associated with a video object.

A saliency score as described herein may be assigned (e.g., by video object saliency scorer block (122), by sound object saliency scorer block (126), etc.) to an object such as a video object, a sound object, a candidate salient object, a salient object, etc., and may be used to indicate how salient the object is. Any combination of a variety of saliency factors may be used to assess a saliency score with respect to an object. For example, a saliency score can be computed with face detection tools, visual difference predictor (VDP), level of visibility, volume, pitch, timbre, etc.

A saliency score may be assessed, assigned, or weighed in relation to an object as described herein based on any combination of a number of saliency factors, which can be physical, audible, visible, motions, etc. For example, an object representing baby crying, which is received, tracked and extracted from input audio data, may be the most salient object in a scene as it grabs a listener's attention. An object representing high pitch police siren may be a relatively highly salient object in a scene as it stands out from anything in ambient sound. An object representing a sports car, which is received, tracked and extracted from input image data, may be a relatively highly salient object in a scene as it is likely to be of interest to a viewer. An object representing a relatively cheap car but with a standout color may be a relatively highly salient object in a scene, as the standout color is visually distinctive.

Salient objects may be a subset selected from a set of candidate salient objects. Some visual features (e.g., threats, dangers, presence of predators, etc.) and/or sounds (e.g., baby crying, etc.) may be important to all human beings as these may be related to survival instincts developed over time/history. Additionally, optionally, or alternatively, saliency score assignment algorithms may implement/incorporate factors, rules or semantics based on cultural reasons. Some visual features and/or sounds important culturally to a specific audience may be assigned relatively high saliency scores. Saliency factors related to a sound object and a video object correlated by a candidate saliency object may be used to assess a saliency score for one or more of the sound object, the video object, the candidate saliency object, etc.

A saliency score of an object may be classified (e.g., by video object saliency scorer block (122), by sound object saliency scorer block (126), etc.) into different discrete categories in a saliency range of continuous or discrete values indicating that the object is not salient, that the object is slightly salient, that the object is moderately salient, that the object is highly salient, etc., to a listener/viewer. The saliency range may be binary, non-binary, non-normalized, normalized, numeric, percentile-based, quartile-based, etc. Salient objects may comprise a subset of objects that are selected from a set of candidate salient objects. Objects that are not in the subset are non-salient objects. In some embodiments, a non-salient object may have a saliency score that is determined to be in a saliency subrange below a first threshold. In some embodiments, a relatively highly salient object may have a saliency score that is determined to be in a saliency subrange above a second threshold (e.g., different from the first threshold, same as the first threshold, etc.). In some embodiments, a moderately salient object may have a saliency score that is determined to be in a saliency subrange between two thresholds (e.g., between the first and second thresholds, etc.).

Some or all of data elements of a candidate salient object can be saved/stored in tables or lists (e.g. linked lists). Example data elements saved/stored in tables/lists may include, but are not necessarily limited to only, any of: identifier (e.g., per image frame, per audio data block, per audio data frame, etc.), spatial values (e.g., position, etc.), temporal or time values (e.g., duration of object appearance from single frame to scene or longer, etc.), perceptual impact (e.g., visual saliency, luminance, colors, sound saliency, volume, pitch, etc.) in terms of human audio or visual perception as represented based on a saliency score, etc. The perceptual impact or saliency score can be determined in any combination of one or more saliency factors that include but are not necessarily limited to only any of: brightness level, darkness level, luminance contrast, color saturation, physical sound volume, timbre change, speech versus non-speech, dissonance from white noise such as waves, rainfall, intense sound, police siren, baby cry, presence of human face (against what are in background or environment), perceptual loudness, pitch, directors/artist intent (which may be automatically derived from source/input media content), etc. In a non-limiting example, the media system (100) may receive input audio data and/or input image data with input audio and/or image metadata that indicates/identifies presence of relatively important visual or sound elements in the input audio data and/or input image data.

7. Tracking Objects with Temporal Interruption

In some embodiments, objects that are identified at different time points may be identified to be the same objects. In an example, audio data portions from a real-world person's speech may be interrupted from time to time. The audio data portions representing the real-world person's speech at different time points may be correlated/extrapolated based on visual information and represented in a single sound object. In a non-limiting implementation, relational data structures such as link lists may be used to link between the different audio data portions in the same sound object, regardless of whether the audio data portions underlying the sound object are interrupted in time. For example, a person may stop speaking for several image frames. Face detection may be used to track the person and to continue aligning a sound object representing the person's speech and its motion vector with that of a video object representing the person's visual features. Thus, the video object may be continuously tracked/extrapolated over time even if audio data portions underlying the sound object disappears temporarily.

In another example, visual data portions corresponding to a real-world person's visual features may be interrupted from time to time. The visual data portions representing the real-world person's visual features at different time points may be correlated/extrapolated based on audio information and represented in a single video object. In a non-limiting implementation, relational data structures such as link lists may be used to link between the different visual data portions in the same video object, regardless of whether the visual data portions underlying the video object are interrupted in time. For example, a person may walk behind a solid object and become invisible at least partially for several image frames. Audio feature detection may be used to track the person and to continue aligning a video object representing the person's visual features and its motion vector with that of a sound object representing the person's speech. Thus, the sound object may be continuously tracked/extrapolated over time even if visual data portions underlying the video object disappears temporarily.

8. Example Usage Scenarios

Media metadata as described herein can not only be used by a media production system that produces output media content (e.g., cinema version, streaming version, broadcast version, VR imagery, AR imagery, etc.) to downstream media devices, but also be used by a media rendering system (e.g., audio video receiver, display system, VR system, AR system, etc.) that uses the media metadata in rendering media content that is received or generated by the media rendering system.

As illustrated in FIG. 1, the media metadata (e.g., candidate salient object, salient object, etc.) can be used by the audio encoder (114) and/or the video encoder (112) to adjust/modify audio content and/or image content to be multiplexed by the multiplexer (116) into output media content in a media container 118 such as a MP4 media file 120, a media stream, etc. Example adjustments/modifications may include, but are not necessarily limited to only, any of: content compression (e.g., allocate a relatively large bit budget of a rate limited bitstream to a salient video object or a salient sound object, etc.); saliency level adjustment (e.g., adjust a salient video object to be more visible, adjust a salient sound object to be more audible, adjust a non-salient video object to be less visible, adjust a non-salient sound object to be less audible, adjust relative perceptibility of one or more objects such as a protagonist and several non-protagonists present in an overall scene context of scene such as a crowded market scene or a cocktail party scene, a book related to a media program's storyline among other books on a bookshelf, etc.); color rendering adjustment (e.g., maintain skin tone color for a protagonist, allocate relatively washed out colors to a crowd in which the protagonist is present, etc.); maintain "spot colors"/"memory colors" of objects (e.g. logos, etc.), etc.

In some embodiments, a media rendering system with which a viewer may be running a VR application may receive/determine/select salient objects from among a plurality of candidate salient objects generated based on sound objects and visual objects. In response to determining that the viewer start looking and/or moving away from a salient object (e.g., a tiger lurching nearby, etc.), the media rendering system may make local visual adjustments and/or local sound adjustments related to the salient object.

Examples of local visual adjustments related to a salient object as described herein may include, but are not necessarily limited to only, any of: increasing local contrast of the salient object, increasing brightness/luminance of the salient object, increasing color saturation of the salient object, amplify optically the salient object such as the main character, creating a viewport around a singer, vivid color, manipulating/implementing specific temporal behaviors of image rendering of the salient object (e.g. slowly pulsating any of the above local adjustments, flashing, etc.), etc., relative to other visual features not represented by the salient object.

Examples of local sound adjustments related to a salient object as described herein may include, but are not necessarily limited to only, any of: increasing loudness of the salient object, moving a sound object corresponding to the salient object perceptually and spatially closer to a viewer/listener, moving non-salient sound (e.g., ambient sound, etc.) to different sound objects (e.g., Dolby ATMOS audio objects, etc.), assigning salient sound to a separate sound object, etc., relative to other sound not represented by the salient object.

Local visual and sound adjustments as described herein can be applied at different spatial scales. In some embodiments, visual and sound adjustments can be made globally on a full input image frame or a full input soundscape. In some embodiments, visual and sound adjustments can be made at a smaller spatial scale than that represented by a full input image frame or a full input soundscape.

A full input image frame may refer to an input image (represented in input image data) an entire spatial scope of which may or may not be entirely displayed to a viewer/user. In some embodiments, the spatial scope of the full input image frame can be cropped with a viewport within which partial visual content of the full input image frame may be rendered to the viewer/user.

A viewport as described herein refers to a spatial shape (e.g., a cut-out, etc.) within an input image or a spherical image used to crop out or extract, transmit, display, etc., a corresponding image portion from the input image. Under techniques as described herein, the viewport may be characterized at least in part by a viewer's viewpoint (or view angle) to the spherical image, and the size, shape, geometry, aspect ratio, etc., of a target display device on which an image adapted (e.g., lens corrected, rectilinearly transformed, etc.) from the extracted image portion is to be rendered. Some examples of viewports are described in U.S. Provisional Patent Application No. 62/272,284.

Additionally, optionally, or alternatively, a full input soundscape may refer to an input soundscape (represented in input audio data) an entire spatial scope of which may or may not be entirely rendered to a listener/user. In some embodiments, the spatial scope of the full input soundscape can be cropped with an audio viewport within which partial audio content of the full input soundscape may be rendered to the listener/user.

An audio viewport as described herein refers to a spatial shape (e.g., a cut-out, etc.) within an input soundscape (e.g., a spherical soundscape, a 3D soundscape, etc.) used to crop out or extract, transmit, display, etc., a corresponding sound portion from the input soundscape. Under techniques as described herein, the audio viewport may be characterized at least in part by a listener's viewpoint (or view angle) to the spatial scope represented by the input soundscape, whether there should be implemented with any acoustic shadows, etc.

An audio viewport may or may not be spatially coextensive with an (e.g., image, visual) viewport. For example, sound objects corresponding to video objects that are visible, not visible, or partially visible may be rendered or may not be rendered based on artistic intent, based on a scene semantics, based on user input, based on a media professional's manipulations, etc.

Media metadata as described herein can be used to provide directional guidance and aid for users in a VR space. For example, in a VR application, in response to determining that an important scene element occurs or is present outside the viewport of a user, media metadata can be used by the VR system to provide perceptual cues/hints to the user to change the user's viewport, for example, by head moving, upper body moving, etc. Example perceptual cues/hints may include, but are not necessarily limited to only, any of: visual cues/hints, acoustic cues/hints, haptic cues/hints, non-visual non-acoustic cues/hints (e.g., mechanical vibration, etc.). Some of these cues/hints may be directional (e.g., vibration occurs when a user moves the user's visual focus away from a danger such as a tiger, etc.), whereas others may be non-directional.

Media metadata as described herein can be used by multiple media systems with same or different capabilities among the media systems. The multiple media systems can be controlled (e.g., by one of the media systems, by a centralized media system controller, by a cloud-based server, etc.) based on an algorithm that creates different media experiences based on availability and capabilities of specific types of media systems as provided by the multiple media systems.

For example, media metadata as described herein can be used by a first media system to interoperate with one or more second media systems (e.g., in the vicinity of the first media system) in a media application such as a VR application, an AR application, a display application, etc. Sound objects and/or visual objects may be mapped to the second media systems based on locations of the sound objects and/or visual objects and locations of the second media systems. For example, a sound object and/or a visual object that is spatially proximate to one of the second media systems may be rendered by that second media system. Examples of media systems may include, but are not necessarily limited to only, any of: mobile phones, tablets, Bluetooth speakers, and 'Internet of Things' objects/devices, etc.

Media metadata such as audio metadata, image metadata, audiovisual metadata (e.g., candidate salient objects, salient objects, etc.) may, but is not necessarily limited to only, spherical metadata that covers a relatively large spherical area/volume relative to a reference position/angle in a spatial environment and that links sound objects (e.g., audio content, audio samples, audio streams, sound tracks, etc.) and video objects (e.g., real-world persons or objects, scene elements, etc.).

The media metadata can be used in many applications. In some embodiments, the media metadata can be used to synchronize and align visual features and audio content (e.g., audio streams, sound tracks) for the purpose of increasing positional and timing mapping accuracy in media content (e.g., media programs, movies, TV shows, outputted by a media production system as described herein, etc.). Since sound objects comprising location-specific time-specific audio content are relatively precisely mapped to video objects comprising location specific time-specific visual features, the audio content of the sound objects and the visual features of the video objects can be rendered accurately by a media rendering system (e.g., a cinema system, a concert, a bar, a home entertainment system, etc.) to give a listener/viewer an immersive media experience.

For example, using media metadata as described herein, phone sound and phone image represented in input audio data and input image data can be accurately matched spatially in time when the phone image is visible, or when the phone image is blocked by obstacle. Similarly, using media metadata as described herein, sound generated by a person and the person represented in input audio data and input image data can be accurately matched spatially in time whether the person is relatively stationary, or the person is moving (e.g., walking away, etc.). Using media metadata as described herein, a person's clapping sound can be accurately tied to the person's hands in space and in time.

In some embodiments, deliberate spatial differences between sound objects and video objects can also be implemented. For example, sound from a sound source represented by a sound object may reach a listener through water reflection, around an obstacle, etc. The sound from the source may be assigned to or rendered at a spatial position corresponding to spots on the water reflection, edges of the obstacle, etc., rather than the actual position of the sound source. Thunder sound and lightning flash may be depicted at different spatial location because of a propagation time difference between the thunder sound and the lightning flash. On the other hand, based on user input and artistic intent, thunder sound and lightning flash may be matched in space and in time (e.g., to shorten waiting time for audience, etc.).

Matching sound objects and video objects can be performed for very fast moving visual features (e.g., airplane, rocket, etc.) as well as for very slow moving visual features (e.g., balloon, boat, etc.). A sound object may or may not comprise sounds have time-varying frequency content (e.g., frequency shifts caused by the Doppler Effect, etc.). A video object may or may not comprise visual features have time-varying image content (e.g., relative motions between different parts of a person or an object, etc.).

In some embodiments, media metadata as described herein can be used for object tracking by one or more end users in games, consumer-generated media content, consumer-contributed media content, consumer-mixed media content, etc. The matched sound/video objects can be used, for example, to improve/enhance audio data captured by a consumer device (e.g., an action camera, etc.) in media content such as VR content, AR content, compute games, etc. The audio data captured by the consumer device may represent a real-world person's voice, can be automatically isolated and selected for emphasis/boost relative to other content (e.g., background noise, surround noise, ambient noise, mechanical noises, another real-world person's voice, etc.), can be accurately time-wise and position-wise to the real-world person's visual feature captured by a camera operating in conjunction with the consumer device, etc.

In some embodiments, media metadata as described herein can be used for object tracking by one or more media production professionals (e.g., sound mixers, audio artists, colorists, etc.) in sound mixing applications, in color grading applications, in combinations of sound mixing and color grading applications, etc. Sound objects and video objects that have been matched (e.g., based on a method as illustrated in TABLE 1, etc.) may be populated in a matched object list and provided to the professionals, who can accept those matched objects (e.g., in a single keystroke, a single user input, etc.) or make corrections and/or adjustments to how any one or more specific sound object should be matched to any one or more specific video object, to how any specific sound object or video object should be positioned at a given time, etc.

In some embodiments, a media system may combine first sound objects and first video objects derived from a first spatial environment (or a first scene) with second sound objects and second video objects derived from one or more second spatial environments (or second scenes) into an overall scene. Additionally, optionally, or alternatively, a media system may combine sound objects (e.g., human voice, ambient sound, etc.) and/or visual objects (e.g., computer-generated graphics, human faces, etc.) that are not necessarily associated with any spatial positions with sound objects (e.g., a human voice, etc.) and/or visual objects (e.g., computer-generated graphics, human faces, etc.) that are located in specific spatial positions in one or more spatial environments. The media system may assign a sound object or a visual object that does not have a spatial position to a specific spatial position (e.g., a person speaking from behind a door, etc.), for example, based on user input. The media system may also assign a sound object or a visual object that has a first spatial position to a second different spatial position, for example, based on user input.

When mixing or combining audio and video content in a studio environment, the video content or spherical images can be displayed around a professional (e.g., a sound mixer/artist, a colorist, etc.), for example via a VR headset worn by the professional or a VR CAVE in which the professional is located. Identified sound objects and/or identified video objects that are available for a scene or a media program can be visually and audibly displayed and labeled, for example, by object identifiers (IDs). This can be done for spherical video content such as spherical movies/programs/games as well as for non-spherical video content such as movies/programs/games on relatively small aspect ratio displays, relatively small viewports, cinema screens, grading monitors, etc., in conjunction with spherical audio content.

In addition to examples that have been given, several additional non-exhaustive examples of use cases of manipulating image information based on media metadata as described herein are provided as follows.

Figure 4A:
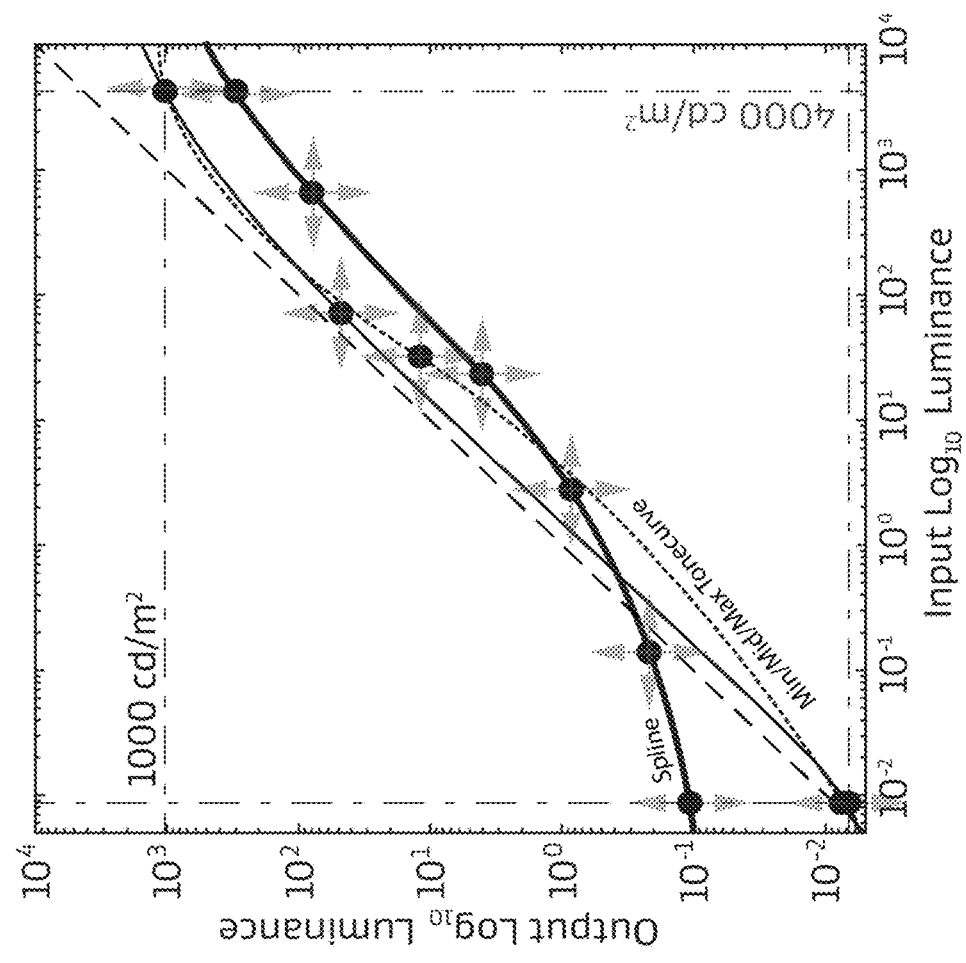
FIG. 4A illustrates example adjustments of a tone mapping curve.

In a first example, a media system (e.g., media production system, media streaming system, media rendering system, etc.) may determine whether one or more salient visual features (e.g., represented by salient objects, etc.) are found in a specific input luminance subrange (e.g., dark portions, etc.) of one or more input images that is likely to be less faithfully represented after display management (DM) related luminance mapping operations (e.g., tone mapping, etc.) are performed on the one or more input images to adapt an input luminance range (e.g., 4000 nits, etc.) that includes the specific input luminance subrange to an output luminance range (e.g., 1000 nits, etc.) supported by target display devices. FIG. 4A illustrates an example tone mapping curve that maps an input luminance range of 4000 nits to an output luminance range of 1000 nits. As used herein, the term "display management" denotes the processing (e.g., tone and gamut mapping) required to map an input video signal of a first dynamic range (e.g., 1000 nits) to a display of a second dynamic range (e.g., 500 nits). Examples of display management processes are described in PCT Application Ser. No. PCT/US2014/016304, filed on Feb. 13, 2014, "Display management for high dynamic range video," by R. Atkins et al., which is incorporated herein by reference in its entirety. Display management may be assisted or controlled by input metadata generated by the source of the incoming content and multiplexed into the coded bitstream.

In response to determining that the salient visual feature are found in the specific input luminance subrange, the media system may adjust/adapt the tone mapping curve to allocate more luminance codewords to the specific luminance subrange so that the salient visual features can be represented more faithfully and can be made perceptually more visible/distinct than without making such adjustment/adaptation of the tone mapping curve. Example adjustment/adaptation of a tone mapping curve may include, but is not necessarily limited to only, any of: changing Mid/Min/Max of the tone mapping curve or by adjusting the tone mapping curve to a pre-configured tone mapping curve shape (e.g. using a spline curve, etc.) that preserves salient visual features better than without making such adjustment/adaptation of the tone mapping curve, etc. Some examples of tone mapping curve adjustment/adaptation are described in the U.S. Provisional Patent Application No. 62/272,284 as previously mentioned.

Figure 4B:
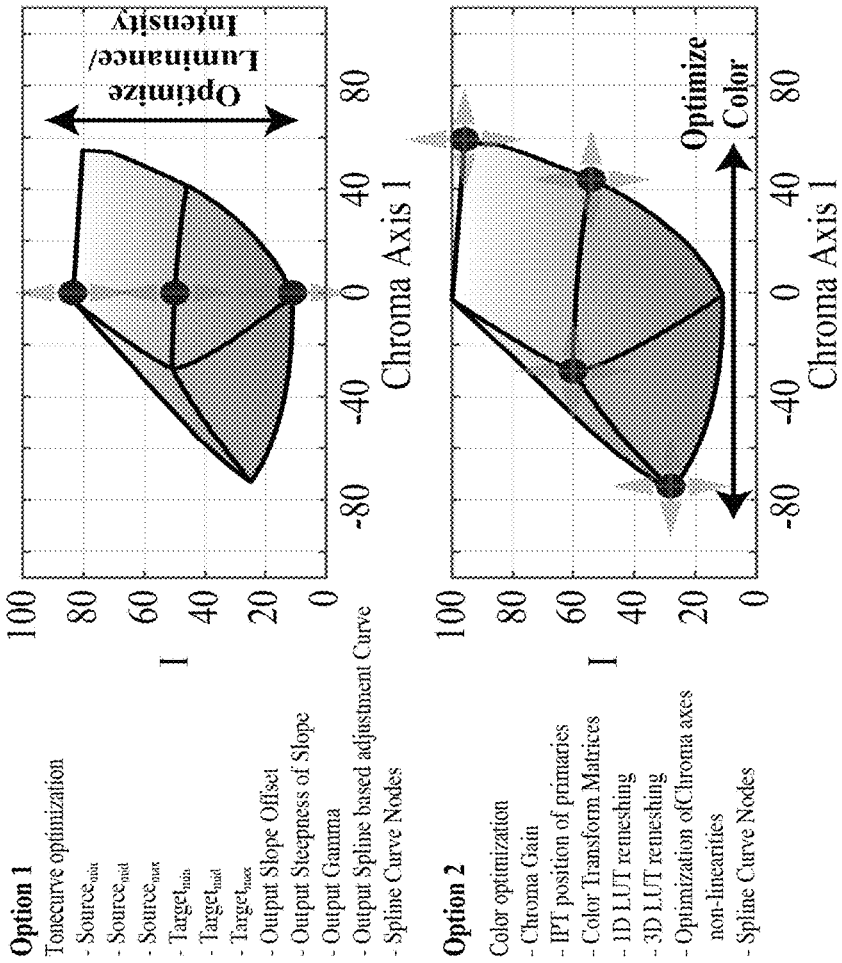
FIG. 4B illustrates example adjustments of visual properties of visual features.

In a second example, a media system (e.g., media production system, media streaming system, media rendering system, etc.) may adjust visual properties of one or more salient visual features (e.g., represented by salient objects, etc.). As illustrated in FIG. 4B, in option 1, luminance properties (along the vertical axis) of a viewport or a local area of a viewport that includes the salient visual features can be adjusted; in option 2, both luminance properties (along the vertical axis) and chroma properties (along the horizontal axis) of a viewport or a local area of a viewport that includes the salient visual features can be adjusted.

Thus, in option 2, color volumes of the salient visual features are altered, possibly in addition to brightness alterations.

Additionally, optionally, or alternatively, in a multi-view image rendering application (e.g. an autostereoscopic 3D (AS3D) display application, etc.), different luminance property changes and/or different chroma property changes can be applied to different viewing angles.

In a third example, a media system (e.g., media production system, media streaming system, media rendering system, etc.) may adjust audio properties of one or more salient sound elements (e.g., represented by salient objects, etc.). By way of illustration but not limitation, sound volumes related to the salient sound elements can be adjusted by the media system based on (e.g., normalized, pre-normalized, etc.) saliency scores assigned to the salient sound elements. In some embodiments, the media system may set a volume multiplier factor (or a gain) for a sound element based on a saliency score of a (candidate) salient object that represents the sound element. A volume multiplier factor of a (non-salient) sound element may be set to a relatively low value (e.g., 0.1, etc.) in response to determining that a saliency score of the sound element is less than a first saliency threshold (e.g., 0.2, etc.).

A volume multiplier factor of a (moderately salient) sound element may be set to a relatively medium value (e.g., 0.1+(SaliencyScore−0.2)^2, etc.) in response to determining that a saliency score of the sound element is between the first saliency threshold (e.g., 0.2, etc.) and a second saliency threshold (e.g., 0.8, etc.).

A volume multiplier factor of a relatively highly salient sound element may be set to a relatively large value (e.g., 1−10*(SaliencyScore−1)^2, etc.) in response to determining that a saliency score of the sound element is above the second saliency threshold (e.g., 0.8, etc.).

Figure 4C:
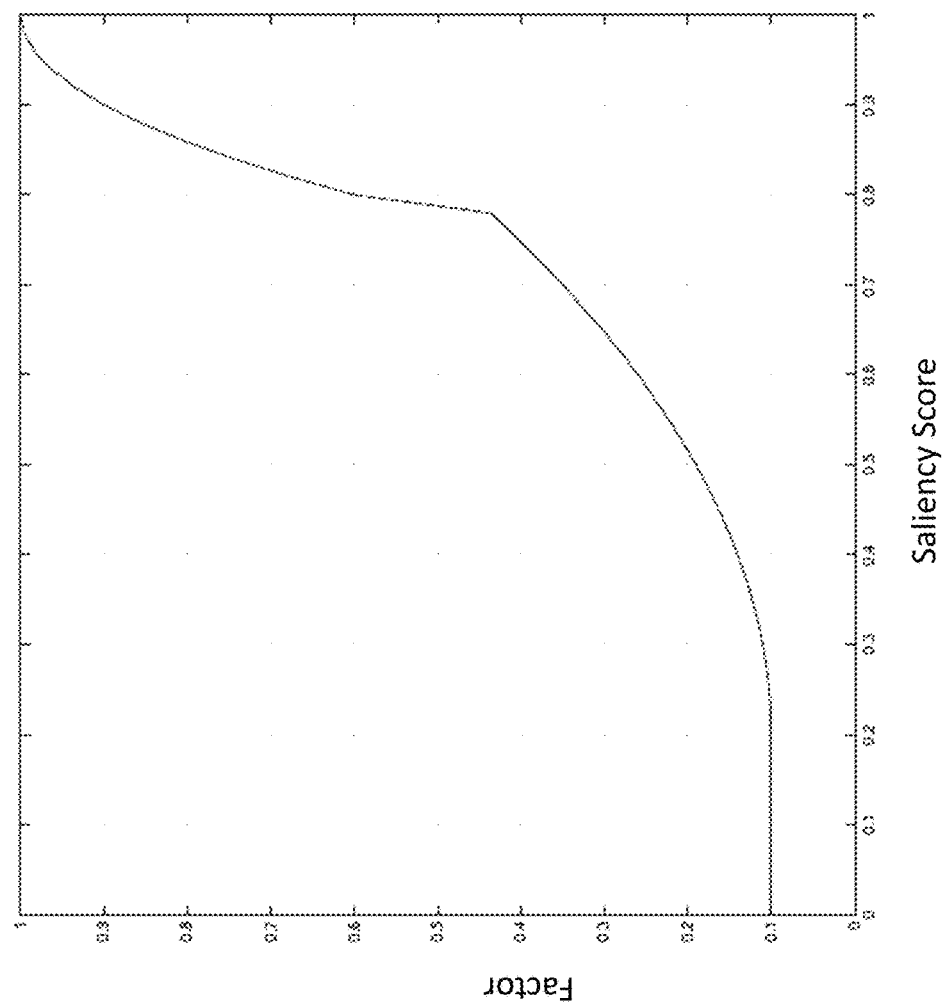
FIG. 4C illustrates an example relationship between a volume multiplier factor and a saliency score related to a sound source.

FIG. 4C illustrates an example relationship between a volume multiplier factor and a saliency score. In some embodiments, an output gain used to set a sound volume of a sound element may be determined as a product of a volume multiplier factor as determined based on a saliency score of a candidate salient object and an input gain of the sound element. In some embodiments, such output gain is capped below a specific gain threshold in order to prevent or reduce audio clipping in audio rendering operations.

In a fourth example, a media system (e.g., media production system, media streaming system, media rendering system, etc.) may perform saliency-based adjustment of both audio and video objects as linked in a candidate saliency object. For example, in a VR scenario where a user's head is moving away from a salient object, a video object (which may be still visible but in visual periphery) in the salient object can be rendered with more contrast and sharper edges while a corresponding sound object in the salient object is rendered spatially closer to the user.

9. Example Process Flows

Figure 5:
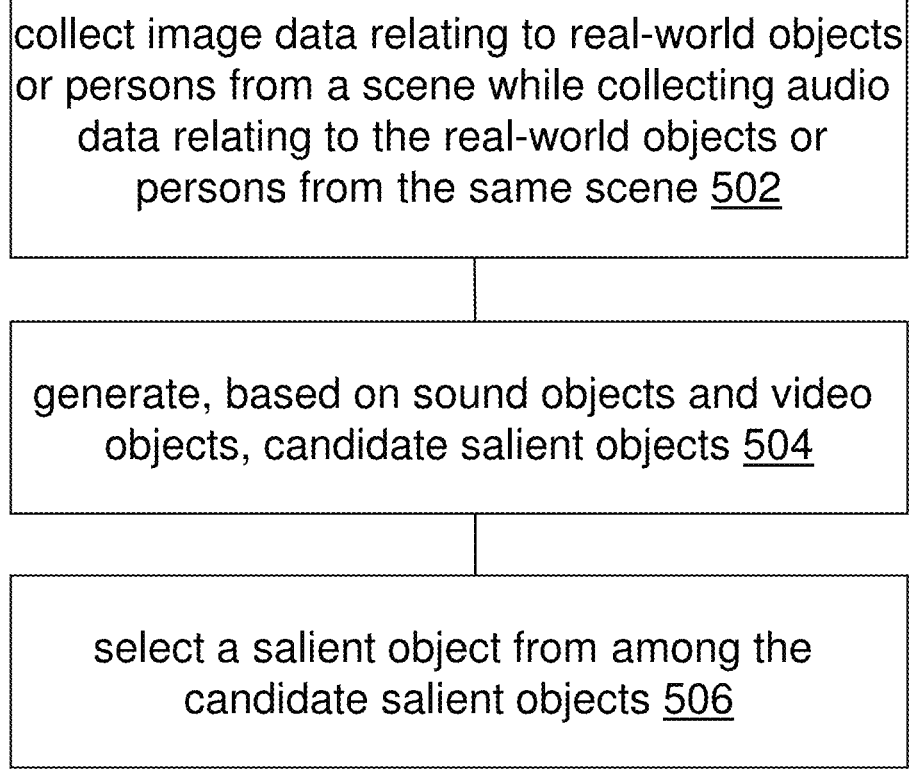
FIG. 5 illustrates an example process flow.

FIG. 5 illustrates an example process flow according to an example embodiment of the present invention. In some example embodiments, one or more computing devices or components may perform this process flow.

In block 502, a media system (e.g., 100 FIG. 1, etc.) collects image data relating to one or more real-world objects or persons from a scene while collecting audio data relating to the one or more real-world objects or persons from the same scene, the audio data being used to derive one or more sound objects corresponding to the one or more real-world objects or persons, the image data being used to derive one or more video objects corresponding to the one or more real-world objects or persons.

In block 504, the media system (100) generates, based on the one or more sound objects and the one or more video objects, one or more candidate salient objects.

In block 506, the media system (100) selects a salient object from among the one or more candidate salient objects. One or more perceptual enhancement operations are performed on the salient object.

In an embodiment, the one or more perceptual enhancement operations comprise one or more of audio manipulation operations, visual manipulation operations, non-audio non-visual manipulation operations, etc.

In an embodiment, the one or more perceptual enhancement operations comprise one or more of: maintaining skin tone of a character represented by the salient object, maintaining a spatial resolution of the salient object in image rendering, performing no or little compression of image data of the salient object, increasing local contrast of the salient object, increasing brightness or luminance of the salient object, increasing color saturation of the salient object, amplify optically a salient, creating a viewport around the salient object, implementing specific temporal behaviors of image rendering of the salient object, pulsating one or more local visual adjustments applied to the salient object, flashing a visible attribute of the salient object, etc., relative to other visual features not represented by the salient object.

In an embodiment, the one or more perceptual enhancement operations comprise one or more of: increasing loudness of the salient object, moving the salient object closer to a listener, moving non-salient sound not represented by the salient object to different sound objects (or audio objects), isolating and assigning salient sound represented by the salient object to a separate audio object from other sound, etc.

In an embodiment, the media system (100) is further configured to automatically match at least one of the one or more sound objects to at least one of the one or more video objects.

In an embodiment, the media system (100) is further configured to perform: displaying one or more images received in the input image data; indicating spatial positions of visual features represented by the one or more video objects on the one or more images; indicating spatial positions of sound elements represented by the one or more sound objects on the one or more images; based on user input, correlating one or more video objects representing one or more of the visual features and one or more sound objects representing one or more of the sound elements; etc.

In an embodiment, the scene represents one or more of: a scene in an artificial environment, a scene in a movie studio, a stationary scene, a moving scene, a rotating scene, a composite scene built with two or more component scenes, etc.

In an embodiment, the audio data is captured by a set of one or more microphones at least one of which is collocated with at least one camera in a set of one or more cameras that collect the image data.

In an embodiment, the audio data is captured by a set of one or more microphones none of which is collocated with any camera in a set of one or more cameras that collect the image data.

In an embodiment, the audio data is captured by a set of one or more microphones at least one of which is a directional microphone.

In an embodiment, the audio data is captured by a set of one or more omnidirectional microphones.

In an embodiment, the audio data is captured by a set of one or more audio beams formed by a set of one or more microphones.

In an embodiment, the image data comprises a group of spherical images.

In an embodiment, a spherical image in the group of spherical images covers a sphere that corresponds to a solid angle as viewed in reference to a camera system, and wherein the solid angle is one of: a hemisphere, a full sphere, a portion of sphere, a contiguous solid angle, one or more disjoint solid angles, etc.

In an embodiment, one or more visual features represented by at least one of the one or more video objects are rendered differently to different viewing angles of a viewer in a three-dimensional (3D) application.

In an embodiment, one or more sound elements represented by at least one of the one or more sound objects are acoustically rendered differently to different spatial angles relative to a listener.

In an embodiment, the media system (100) is further configured to use a viewport to select visual features of one or more images derived from the input image data for visual rendering.

In an embodiment, the media system (100) is further configured to use an audio viewport to select audio elements as derived from the input image data for acoustical rendering.

In an embodiment, the audio viewport is different in spatial dimension from a viewport that selects visual features of one or more images derived from the input image data for visually rendering at the same time the audio elements are acoustically rendered.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
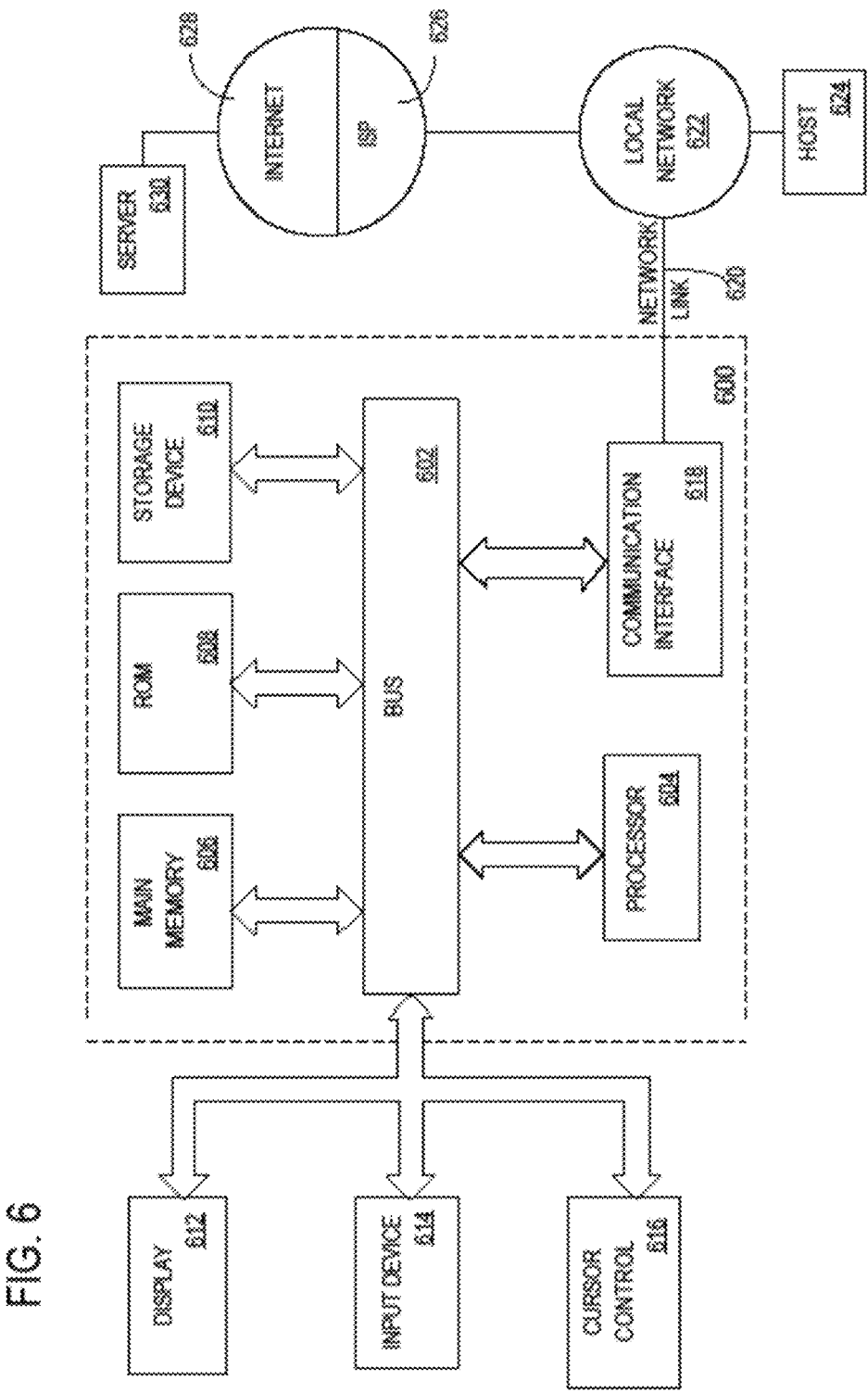
FIG. 6 illustrates an example hardware platform on which a computer or a computing device as described herein may be implemented.

For example, FIG. 6 is a block diagram that illustrates a computer system 600 upon which an example embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604.

A storage device 610, such as a magnetic disk or optical disk, solid state RAM, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

11. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    collecting image data relating to one or more real-world objects or persons from a scene while collecting audio data relating to the one or more real-world objects or persons from the same scene, the audio data being used to derive one or more sound objects corresponding to the one or more real-world objects or persons, the image data being used to derive one or more video objects corresponding to the one or more real-world objects or persons;
    generating, based on the one or more sound objects and the one or more video objects, one or more candidate salient objects;
    selecting a salient object from among the one or more candidate salient objects and performing one or more perceptual enhancement operations on the salient object;
    wherein the method is performed by one or more computing devices.

2. The method of claim 1, wherein the one or more perceptual enhancement operations comprise one or more of audio manipulation operations, visual manipulation operations, or non-audio non-visual manipulation operations.

3. The method of claim 1, wherein the one or more perceptual enhancement operations comprise one or more of: maintaining skin tone of a character represented by the salient object, maintaining a spatial resolution of the salient object in image rendering, performing no or little compression of image data of the salient object, increasing local contrast of the salient object, increasing brightness or luminance of the salient object, increasing color saturation of the salient object, amplify optically a salient, creating a viewport around the salient object, implementing specific temporal behaviors of image rendering of the salient object, pulsating one or more local visual adjustments applied to the salient object, or flashing a visible attribute of the salient object, relative to other visual features not represented by the salient object.

4. The method of claim 1, wherein the one or more perceptual enhancement operations comprise one or more of: increasing loudness of the salient object, moving the salient object closer to a listener, moving non-salient sound not represented by the salient object to different audio objects, or isolating and assigning salient sound represented by the salient object to a separate audio object from other sound.

5. The method of claim 1, further comprising automatically matching at least one of the one or more sound objects to at least one of the one or more video objects.

6. The method of claim 1, further comprising:
    displaying one or more images received in the input image data;
    indicating spatial positions of visual features represented by the one or more video objects on the one or more images;
    indicating spatial positions of sound elements represented by the one or more sound objects on the one or more images;

based on user input, correlating one or more video objects representing one or more of the visual features and one or more sound objects representing one or more of the sound elements.

7. The method of claim 1, wherein the scene represents one or more of: a scene in an artificial environment, a scene in a movie studio, a stationary scene, a moving scene, a rotating scene, or a composite scene built with two or more component scenes.

8. The method of claim 1, wherein the audio data is captured by a set of one or more microphones at least one of which is collocated with at least one camera in a set of one or more cameras that collect the image data.

9. The method of claim 1, wherein the audio data is captured by a set of one or more microphones none of which is collocated with any camera in a set of one or more cameras that collect the image data.

10. The method of claim 1, wherein the audio data is captured by a set of one or more microphones at least one of which is a directional microphone.

11. The method of claim 1, wherein the audio data is captured by a set of one or more omnidirectional microphones.

12. The method of claim 1, wherein the audio data is captured by a set of one or more audio beams formed by a set of one or more microphones.

13. The method of claim 1, wherein the image data comprises a group of spherical images.

14. The method of claim 13, wherein a spherical image in the group of spherical images covers a sphere that corresponds to a solid angle as viewed in reference to a camera system, and wherein the solid angle is one of: a hemisphere, a full sphere, a portion of sphere, a contiguous solid angle, or one or more disjoint solid angles.

15. The method of claim 1, wherein one or more visual features represented by at least one of the one or more video objects are rendered differently to different viewing angles of a viewer in a three-dimensional (3D) application.

16. The method of claim 1, wherein one or more sound elements represented by at least one of the one or more sound objects are acoustically rendered differently to different spatial angles relative to a listener.

17. The method of claim 1, further comprising using a viewport to select visual features of one or more images derived from the input image data for visual rendering.

18. The method of claim 1, further comprising using an audio viewport to select audio elements as derived from the input image data for acoustical rendering.

19. The method of claim 1, wherein the audio viewport is different in spatial dimension from a viewport that selects visual features of one or more images derived from the input image data for visually rendering at the same time the audio elements are acoustically rendered.

* * * * *